United States Patent Office 3,127,393
Patented Mar. 31, 1964

3,127,393
REACTION OF AMIDE AND TRIAZINE SUBSTITUTED STARCHES WITH POLYALDEHYDES
Frederick D. Thayer, Jr., Western Springs, Ill., assignor to Corn Products Company, New York, N.Y., a corporation of Delaware
No Drawing. Filed Mar. 13, 1961, Ser. No. 94,982
7 Claims. (Cl. 260—233.3)

This invention relates to the production of water-resistant films and surface coatings from starch derivatives. More particularly, it relates to the production of water-resistant films and surface coatings from the reaction products of certain starch derivatives and polyaldehydic compounds. The use of the expression "starch derivatives" is intended to include starch derivatives containing amide groups which are reactive toward aldehydes, e.g. amides containing two hydrogens on the nitrogen and amino triazine ethers of starch. Examples of such starch derivatives include starch propionamide, the 2,4-diaminotriazine ether of starch prepared from starch and 2,4-diaminotriazine ether of starch prepared from starch and 2,4-diamino, 6-chlorotriazine, and starch carbamate prepared from starch and urea. It is preferable to use starch propionamide because of its relatively low cost and ease of preparation.

The starch propionamides used in the present invention are the starch ethers produced from the reaction of acrylamide with starch in the granule or pasted form. The starch propionamides may be prepared from all starches and starch fractions; however, this invention is particularly applicable to the derivatives prepared from acid- or enzyme-modified corn and waxy starches. It is applicable to the derivatives of corn, potato, tapioca, sago, rice, wheat, waxy maize, and grain sorghum starches in raw or modified form, e.g., modified with acids, enzymes or oxidizing agents. It is also applicable to the derivatives of amylose and amylopectin, the components of starch. Also, double derivatives of starch, in which one of the substituent groups is propionamide or a similar aldehyde reactive group, may be used for preparing insoluble reaction products with polyaldehydic compounds. The starch propionamide derivative may be prepared in either a granular or pasted form.

It has been shown in copending application Serial No. 814,133, filed jointly with E. F. Paschall, F. D. Thayer, Jr., and W. H. Minkema on May 19, 1959, now U.S. Patent 3,101,330, that starch propionamide and formaldehyde react under alkaline conditions to form methylol addition products which cure under acid conditions to produce water-resistant films. These methylol derivatives of starch propionamides and formaldehyde do not, however, cure under alkaline conditions to form films of reduced water-solubility as has now been found to occur with starch propionamides and polyaldehydic compounds. Up to the present time, it has not been possible to make a starch propionamide-aldehyde reaction product which could be cured under alkaline conditions.

By the term, "polyaldehyde," is meant any compound having at least two aldehyde groups. Examples of polyaldehydes which may be used in the present invention include, for example, dialdehyde starch, glutaraldehyde, α-hydroxyadipaldehyde, and glyoxal, all of which are commercially available. However, this invention is not limited to these polyaldehydes.

Dialdehyde starches may be prepared by the periodate oxidation of starches as disclosed in United States Patents 2,648,629, Dvonch and Mehltretter, and 2,713,553, Mehltretter. The degree to which the starch is oxidized to dialdehyde may be varied from a few percent to as high as 90 percent or over. The present invention is not limited to any particular dialdehyde degree of conversion. However, it is preferable to use dialdehyde starch which has been oxidized to the 90 percent range with respect to dialdehyde content.

The preparation of films of reduced water solubility is illustrated below using granular starch propionamide. The starch derivativie is first gelatinized in aqueous solution in the presence of or absence of the polyaldehyde at elevated temperature. In the course of heating, the starch granules are ruptured and a gelatinous paste is obtained. After the gelatinization step, the paste may be cooled and the polyaldehyde added, if the aldehydic compound was not added prior to the gelatinization step. The pH of the starch-polyaldehyde mixture is adjusted so that reaction between the starch amide derivative and polyaldehyde will take place to yield the desired degree of water-resistance or water-insolubility. I prefer to adjust the mixture with an acid or alkali, or with an acid or alkaline salt, to a pH within the range of about 4 to about 11. However, in no sense is my invention to be considered as applicable only to this pH range as higher or lower values may be employed.

It is old in the art to prepare water-insoluble and water-resistant products of starch using phenol- and aminoplast resins. However, when such mixtures are cured, insolubilization takes place primarily from polymerization of the resin rather than by interaction of resin with the starch. The insolubilization occurs under acidic conditions, e.g., high temperature and an acid pH, but not under alkaline conditions. My discovery that starch derivatives containing amide groups will react with a polyaldehydic compound to form products which are insoluble under alkaline conditions enhances the utility of my invention. For example, it has long been desired to improve the wet-rub resistance of the alkaline starch coatings applied to paper, such as the pigmented coatings, where starch is used as the adhesive or binder. Up to the present time it has not been possible to do this at an alkaline pH except by replacing a large portion of the starch with a thermosetting or thermoplastic resin, which generally results in poor binding of pigment to paper. Now it is not necessary to substitute resin for a large portion of the starch. By practicing my invention, a starch amide derivative and a small quantity of a polyaldehyde (either dialdehyde starch or other polyaldehyde) may be employed to obtain good wet-rub resistance under alkaline conditions and obtain good binding of pigment to paper.

The utility of my invention is not limited to its application to pigmented coatings for paper. My invention is applicable in general for uses in which films and coatings of reduced water-solubility are desired, such as for example, the production of water-resistant adhesives and laminates.

I have found that the degree of water-insolubility of the final film is related to the viscosity and degree of substitution of the starch propionamide, the amount of polyaldehyde employed, the curing temperature and the pH at which curing takes place. As the viscosity of the starch propionamide increases at constant degree of substitution, less polyaldehyde compound is required to effect the same degree of water-insolubility. The same relationship holds true with respect to increasing degree of substitution at constant viscosity of the starch derivative. The rate of insolubilization is dependent upon curing temperature and pH, and increases as both of these factors are increased. This invention is not restricted or limited to any particular degree of substitution, method of preparation, starch viscosity, amount of polyaldehyde compound, curing temperature or pH.

The following examples describe the nature of my invention. The examples are intended as typical and informative only and in no way limit the invention.

*Example I*

This example illustrates the relationship of pH to the degree of insolubilization obtained with starch propionamide-dialydehyde starch reaction products. A paste of starch propionamide and dialdehyde starch was prepared using the quantity of materials shown below.

| | Grams |
|---|---|
| Corn starch propionamide (0.21 D.S.) | 247 |
| Dialdehyde starch (over 90 percent aldehyde content) | 22 |
| Water | 941 |
| Water, dilution | 400 |

The starch propionamide and dialdehyde starch were slurried in the 941 grams of water in a three-necked flask provided with agitator and thermometer. The slurry was pasted under agitation in a boiling water bath. When the temperature reached 92° C., heating was terminated, and the paste was cooled to room temperature. Dilution water was added to reduce the total solids to 15 percent. The pH of the diluted paste was 6.2. Portions of the paste, 300 grams, were adjusted with dilute sulfuric acid or caustic soda solution to cover the pH range from 4.0–9.0. Films were cast on stainless steel plates using an applicator having a 20-mil opening. The cast films were cured by drying in an air circulating oven at 80° C. for one hour, the films were removed, ground, and screened, using 50 and 100 mesh (U.S. standard) sieves. The portion passing 50 mesh but retained on 100 mesh was analyzed for percent solubles from which percent insolubles was calculated, i.e., 100 minus percent solubles, following the procedure described below.

The dry substance of the ground film was determined by drying 1-gram samples in a vacuum oven at 120° C. for four hours. Insolubles were determined by agitating a 1-gram sample of ground film in a 50 ml. Erlenmeyer flask with 35 ml. of distilled water in a 50° C. constant temperature bath for one hour. The flask was provided with a seal to prevent loss of moisture. The contents of the flask were transferred to a centrifuge tube and centrifuged for 20 minutes. The supernatant was filtered through a corse sintered glass filter funnel into a 125-ml. flask using moderate vacuum. An aliquot of the filtrate was transferred to a nickel dish, and dried overnight in an oven at 65–70° C. On the following morning the dish was transferred to the vacuum oven and dried at 120° C. for four hours and weighed. The percent solubles was then calculated as percent of dry sample weight. The value obtained subtracted from 100 gave percent insoluble based on dry sample weight.

The effeffct of pH on film solubility of the starch propioffnamide and dialdehyde starch reaction product is shown below.

| pH | 4.0 | 5.5 | 6.5 | 7.5 | 9.0 |
|---|---|---|---|---|---|
| Insolubles, percent | 27.4 | 33.0 | 55.1 | 63.1 | 74.4 |

The above data show that film insoluble increase directly with increasing pH from pH 4 through 9.

*Example II*

The example shows that dialdehyde starch does not react with starch hydroxyls but with substituted amide groups to form insoluble products.

Films were prepared from the following materials in the manner described in Example I and analyzed for insolubles. The data obtained are shown below.

| | Percent Insolubles | |
|---|---|---|
| | pH 6.0 | pH 9.0 |
| 1. Starch propionamide | 0.7 | 0.6 |
| 2. Starch propionamide Dialdehyde starch, 11% | 49.8 | 65.3 |
| 3. White milo starch | | 3.0 |
| 4. White milo starch Dialdehyde starch, 11% | | 1.4 |

Examination of the insolubies data shows that only in case No. 2 using starch propionamide-dialdehyde starch did substantial insolubilization take place upon curing the films under acid and alkaline conditions.

*Example III*

In this example the ratio of dialdehyde starch to starch propionamide is shown to influence the percent of insolubles. In this experiment a starch propionamide of 0.21 D.S. was used. Two set of experiments were carried out. In one case a paste of dialdehyde starch was added to a paste of the starch propionamide. The pH of this paste prior to the casting of films was 8.6. In the second case, the two derivatives were pasted together, and after cooling to room temperature, the pH was adjusted to 8.6 prior to casting films.

In the A set of experiments, dialdehyde starch, 10 percent by weight, was dissolved in 1.0 N sodium bicarbonate. Using the procedure of Example I, starch propionamide pastes were prepared by slurrying the starch propionamide in 0.1 N sodium bicarbonate to obtain a paste containing 15 percent total solids. The dialdehyde starch paste was added to the starch propionamide paste at 27° C. and agitation continued for 15 minutes. The pH of the mixture was 8.6 prior to film casting. Films were cast at 15 mils. and dried in an air circulating oven at 50° C. for one hour.

The B set of experiments was carried out by pasting the starch propionamide and dialdehyde starch together in distilled water. After cooling to 270 C., the pastes were adjusted of pH 8.6 with caustic soda solution in order to duplicate the pH of the first set. Films were cast and dried as described. All films were analyzed as outlined in Example I.

Films insolubles are tabulated below.

| | Percent Insolubles | | |
|---|---|---|---|
| Percent Dialdehyde Starch | 3 | 6 | 9 |
| A. Mixing Pastes of the Two Components | 6.7 | 42.7 | 49.9 |
| B. Pasting the Two Components Together | 8.8 | 18.7 | 20.9 |

The results show that insolubilization increases with increasing proportions of dialdehyde starch. The degree of insolubilization is greater in the case of the treatment A; however, either method of mixing will impart some water-insolubility to the films.

*Example IV*

In this example the curing temperature is shown to influence the degree of film insolubilization. Films were cast from the preparations shown in Example III under treatment B. The cast films were dried at 80° C. for one hour and analyzed for insolubles. The insolubles data are reported below.

| | Percent Insolubles | | | |
|---|---|---|---|---|
| Percent Dialdehyde Starch | 0 | 3 | 6 | 9 |
| Drying at 50° C | 1.3 | 8.8 | 18.7 | 20.9 |
| Drying at 80° C | 0.6 | 46.3 | 49.7 | 57.9 |

The data show that an increase in drying temperature, from 50° to 80° C. has a marked effect in promoting insolubilization of the starch propionamide-dialdehyde starch reaction product. Starch propionamide, without dialdehyde starch is not insolubilized at either 50° or 80° C.

*Example V*

In this example the degree of insolubilization is shown to be related to the propionamide degree of substitution. Three starch propionamides of 0.07, 0.21 and 0.28 D.S. were employed. Pastes of each were prepared using 3, 6 and 9 percent of dialdehyde starch based on the dry weight of the starch derivatives. The procedure used for preparing the pastes is described in Example I. The pastes were adjusted to pH 9.0 with dilute caustic soda prior to casting films. The cast films were dried at 80° C. for one hour and then analyzed for insolubles. The results obtained are shown in the table below.

|  | Percent Insolubles | | |
|---|---|---|---|
| Percent Dialdehyde Starch | 3 | 6 | 9 |
| Propionamide D.S. 0.07 | 12.5 | 27.0 | 28.6 |
| Propionamide D.S. 0.21 | 46.0 | 64.1 | 69.5 |
| Propionamide D.S. 0.28 | 64.1 | 75.8 | 78.0 |

The data show that insolubles increase as the percentage of dialdehyde starch is increased and as the degree of substitution is increased.

*Example VI*

In this example both the effect of starch propionamide D.S. and fluidity on the reaction with dialdehyde starch was investigated. The propionamides were prepared from acid-modified corn starch to yield derivatives of 59, 66 and 76 fluidity at D.S. levels of 0.10, 0.15 and 0.20, respectively. Pastes were prepared as described in Example I, employing 3 percent of dialdehyde starch based on the dry weight of starch propionamide. The pastes were adjusted to pH 6.0 and the films were cast and dried at 80° C. for one hour. Analysis for insolubles gave the results tabulated below.

|  | Percent Insolubles | | |
|---|---|---|---|
| Starch Propionamide D.S. | 0.10 | 0.15 | 0.20 |
| Fluidity 59 | 38.8 | 46.8 | 56.9 |
| Fluidity 66 | 34.9 | 37.8 | 51.4 |
| Fluidity 76 | 3.1 | 8.2 | 30.1 |

The data show that insolubles increases with increasing D.S., but decrease as the fluidity of the starch propionamide increases. This latter observation indicates that the degree of insolubilization is related to the viscosity of the starch derivatives. Based on the data of the previous examples, it can be concluded that the degree of insolubization can be regulated by controlling the amount of dialdehyde starch, the pH of the reaction mixture, the curing temperature, and the degree of substitution and the fluidity (viscosity) of the starch derivatives.

*Example VII*

In this example it is shown that glutaraldehyde reacts with starch propionamide effecting marked insolubilization under both acid and alkaline conditions. The experiment was carried out in the following manner:

Four slurries of a starch propionamide, each at 0.14 D.S. and 76 fluidity, were prepared using 600 grams of water per 130 grams of starch propionamide. Forty ml. of a 25 percent aqueous solution of glutaraldehyde were added to two of the slurries, and 80 ml. were added to the other two. These mixtures were pasted under agitation in a boiling water bath for 15 minutes and cooled to room temperature. One paste of each set was adjusted to approximately pH 5.0 and the other two adjusted to pH 8.6. Films were cast at 15 mils and dried at 80° C. for one hour. Portions of the pastes were aged for 4 days at room temperature and films were cast and dried as described above. The ground films were analyzed as previously outlined. The results are reported below.

|  | Percent Insolubles | | | |
|---|---|---|---|---|
| Mole Ratio Glutaraldehyde to Propionamide [a] | 1:1 | | 2:1 | |
| pH | 5.0 | 8.6 | 5.0 | 8.6 |
| Not Aged | 5.1 | 40.4 | 23.8 | 49.5 |
| Aged | 19.9 | 39.9 | 24.2 | 53.7 |

[a] Moles of glutaraldehyde per mole of amide substituent on starch.

The data show that insolubilization is greater under alkaline conditions than acid. Film insolubility increases as the mole ratio of glutaraldehyde to propionamide is increased. An improvement in film insolubility was noted after four days in the case of the paste at pH 5.0. The results are similar to those obtained in the preceding examples using dialdehyde starch.

*Example VIII*

In this example it is shown that alpha-hydroxyadipaldehyde may be used to partially insolubilize starch propionamide. Slurries of a 76 fluidity starch propionamide (0.16 D.S.) containing different amounts of alpha-hydroxyadipaldehyde were prepared and treated in the manner described in Example VII. Film solubility data are given below.

| Mole Ratio Aldehyde to Propionamide | 0.34:1 | 0.34:1 | 0.68:1 | 1.36:1 |
|---|---|---|---|---|
| pH | 4.5 | 9.0 | 9.0 | 9.0 |
| Percent Insolubles | 2.1 | 2.6 | 13.8 | 22.1 |

These data show that alpha-hydroxyadipaldehyde insolubilizes starch propionamide to a greater degree at pH 9.0 than at pH 4.0. Insolubilization was found to increase with increasing levels of aldehyde concentration.

*Example IX*

In this example glyoxal is shown to be an effective reagent for reducing the solubility of starch propionamide under either acidic or alkaline conditions.

As in the case of Example VII, slurries of a 76 fluidity starch propionamide (0.14 D.S.) containing varying amounts of glyoxal were prepared. The slurries were pasted as previously described, and the pH values of the pastes adjusted to the desired values prior to film casting. The cast films were then dried at 80° C. for one hour. Film insolubles as a function of pH and mole ratio of glyoxal to substituted amide are tabulated below.

| Mole Ratio Glyoxal to Propionamide | 0.25:1 | | 1:1 | |
|---|---|---|---|---|
| pH | 5.0 | 9.0 | 5.0 | 9.0 |
| Percent Insolubles | 11.0 | 79.0 | 28.8 | 79.6 |

Again the data in the above table show the marked effect which polyaldehydes have on reducing the water solubility of starch propionamide especially under alkaline conditions. The results indicate that even lower ratios of glyoxal to propionamide should be effective in insolubilizing starch propionamide.

*Example X*

This experiment demonstrates that very small quantities of glyoxal act as an effective agent for decreasing the solubility of starch propionamide. Except for the amount of glyoxal used, the experiment was carried out under the conditions employed in Example IX. The percent insolubles obtained, using pastes adjusted to pH 6.0 and 9.0 with different mole ratios of glyoxal to substituted propionamide groups, is shown below.

| Mole Ratio of Glyoxal to Propionamide | Percent Insolubles | |
|---|---|---|
| | pH 6.0 | pH 9.0 |
| 0.136 | 15.5 | 69.5 |
| 0.068 | 16.5 | 55.4 |
| 0.034 | 3.8 | 36.9 |

It is observed that glyoxal is an extremely effective insolubilizing agent for starch propionamide. Mole ratios of glyoxal to propionamide as low as 0.034 mole per mole of propionamide substantially reduces the solubility of starch propionamide.

*Example XI*

This example illustrates the relationship of high pH to the degree of insolubilization obtained with starch propionamide-glyoxal reaction products. The procedure of Example IX was followed except that 76 fluidity starch propionamide of 0.13 D.S. was used. The glyoxal was added after pasting and cooling the starch derivative to room temperature. The mole ratio of glyoxal to propionamide was 0.125. Film insolubles as a function of pH are tabulated below.

| pH | 9.0 | 10.0 | 11.0 |
|---|---|---|---|
| Insolubles, percent | 76.2 | 83.7 | 71.6 |

The results show that glyoxal insolubilizes starch propionamide up to a pH of at least 11.

*Example XII*

A test was made to determine whether or not glyoxal is an effective reagent when used with high fluidity starch propionamides. For the purposes of this test, 94-fluidity starch propionamides of 0.11, 0.16 and 0.23 D.S. were used. The experiment was carried out as described under Example X, except that all pastes were used at pH 9.0.

The results of this test are reported below.

| Mole Ratio of Glyoxal to Propionamide | Percent Insolubles | | | |
|---|---|---|---|---|
| | 0 | 0.125:1 | 0.25:1 | 0.5:1 |
| Starch Propionamide, 0.11 D.S. | 0.9 | 0.1 | 2.0 | 1.5 |
| Satrch Propionamide, 0.16 D.S. | 0.4 | 4.2 | 14.8 | 29.9 |
| Starch Propionamide, 0.23 D.S. | 1.3 | 42.6 | 54.1 | 49.4 |

These data show glyoxal to be effective for reducing the water-solubility of high fluidity starch propionamides. As to be expected, based on the results shown in the preceding examples, its effectiveness increases with degree of substitution and the amount of glyoxal employed.

It is apparent that it is possible to reduce the solubility of starch propionamides of varying levels of fluidity and degree of substitution over a broad pH range by the use of polyaldehydic compounds.

The following examples are used to illustrate the utility of this invention.

*Example XIII*

In this example the properties of films of starch propionamide-dialdehyde starch, cured by drying at room temperature and conditioned at 70 percent relative humidity for 24 hours, are shown.

Films were cast on clear glass plates using the pastes described in Example III. They were cured by air drying overnight and conditioned as stated above. The films were examined for gloss, clarity and tack. Gloss was observed using reflected light, while clarity was measured using transmitted light. Tack was observed both dry and wet. Dry tack was measured by rubbing the surface of the film with the dry forefinger, wet tack with the wet forefinger. The properties of the films as found by the above tests are tabulated below.

| Series | Dialdehyde Starch, percent | Gloss | Clarity | Tack | |
|---|---|---|---|---|---|
| | | | | Dry | Wet |
| A | 3 | Good | Excellent | None | Slight. |
| A | 6 | do | do | do | Very slight. |
| A | 9 | do | do | do | Do. |
| B | 3 | do | do | do | Do. |
| B | 6 | do | do | do | Do. |
| B | 9 | do | do | do | Do. |
| Control | 0 | do | Slight haze | do | Very tacky. |

The above data show that films of starch propionamide-dialdehyde starch possess good gloss, excellent clarity and improved wet tack. Both wet-tack and clarity are improved over starch propionamide alone.

*Example XIV*

This example compares the effectiveness of dialdehyde starch-starch propionamide compositions with starch propionamide alone as a clay coating adhesive for improving wet-rub resistance. A 72 fluidity starch propionamide of 0.21 D.S. was used as the adhesive together with 1, 3 and 5 percent of dialdehyde starch based on the weight of the adhesive. A kaolin clay was employed in preparing the pigment slip. The properties of the coating colors are given below.

| Adhesive | Adhesive, grams/100 grams Clay | pH | Brookfield Viscosity[a] | Pseudo Plastic Index[b] | Thixotropic Value[c] |
|---|---|---|---|---|---|
| 1. Starch Propionamide | 20 | 8.9 | 3,510 | 3.9 | 1.3 |
| 2. Starch Propionamide | 19.8 | 8.2 | 5,320 | 4.5 | 1.2 |
| Dialdehyde Starch, 1% | 0.2 | | | | |
| 3. Starch Propionamide | 19.4 | 9.3 | 8,600 | 6.1 | 1.1 |
| Dialdehyde Starch, 3% | 0.6 | | | | |
| 4. Starch Propionamide | 19.0 | 9.1 | (d) | 6.9 | 1.2 |
| Dialdehyde Starch, 5% | 1.0 | | | | |

[a] Brookfield viscometer Model RVT, 20 r.p.m. after 24 hours at 110° F.
[b] Ratio of the viscosity (centipoises) at maximum shear to the viscosity at minimum shear.
[c] Ratio of the ascending viscosity (centipoises) to the descending viscosity at equal rates of shear.
[d] Too heavy.

The coatings were applied to offset grade base coating stock, 44 pounds, basis weight, using a number 8 Mayer rod. After aging the coated stock for 5 days, physical tests were made. The results are reported below.

| Adhesive (See data above for adhesive composition) | 1 | 2 | 3 | 4 |
|---|---|---|---|---|
| Wax Pick At | 8 | 8 | 8 | 9 |
| Dow Finger Test (No. of Strokes, Degree Removed) | [a] 2 | [b] 7 | [b] 7 | [b] 7 |
| Coating Removed, Percent[c] | 59.2 | 4.8 | 4.8 | 3.6 |
| Coating Weight, lb./ream | 9.1 | 11.4 | 11.7 | 12.1 |
| Brightness | 75 | 75.5 | 75.0 | 75.0 |
| Opacity | 91.5 | 92.0 | 92.7 | 92.7 |
| Gloss | 16.7 | 16.7 | 18.0 | 17.3 |

[a] Heavy.
[b] Slight.
[c] Hull Wet-Rub Tester, "Measurement of wet-rub resistance of paper coatings," G. A. Hull, The Paper Industry, 41, 783-782 (1960).

The data in the above table show that wax pick is not affected by the use of dialdehyde starch. A marked improvement in the wet-rub resistance of papers coated with starch propionamide and dialdehyde starch over starch propionamide alone is observed. The practicality of using as low as 1 percent of dialdehyde starch on starch propionamide is demonstrated.

*Example XV*

This example demonstrates the effectiveness of glyoxal and a 94-fluidity starch propionamide of 0.23 D.S. for imparting wet-rub resistance without deleterious effect on wax pick. Clay coatings were prepared using 20 percent of adhesive based on clay. Total solids in the coating colors was 55 percent. The physical properties of the coating colors are listed below.

| Adhesive | Mole Glyoxal/ Mole Propionamide | pH | Viscosity, c.p.s.[a] | Pseudo Plastic Index | Thixotropic Value |
|---|---|---|---|---|---|
| 1. Starch Propionamide | 0 | 9.0 | 2,700 | 4.6 | 1.06 |
| 2. Starch Propionamide Glyoxal | 0.0625 | 9.0 | 2,940 | 4.8 | 1.04 |
| 3. Starch Propionamide Glyoxal | 0.125 | 9.0 | 4,720 | 5.1 | 1.04 |
| 4. Starch Propionamide Glyoxal | 0.25 | 9.0 | 17,000 | 5.6 | 1.08 |

[a] Brookfield viscometer Model LVF No. 4 and No. 3 spindle, 12 r.p.m. Viscosity determined after 24 hours at 110° F.

The coating colors were applied to 50-pound coating rawstock using a number 6 Mayor rod. The coated papers were evaluated after aging 3 days at room temperature. The results are tabulated below.

| Adhesive No. | 1 | 2 | 3 | 4 |
|---|---|---|---|---|
| Wax Pick at | 8 | 8 | 8 | 8 |
| Dow Finger Test (No. of Strokes, Degree shown) | [a] 2 | [b] 3 | [b] 3 | [b] 4 |
| Coating Removed, Percent [c] | 70.5 | 9.0 | 5.3 | 4.0 |
| Coating Weight | 13.0 | 12.1 | 12.8 | 14.8 |

[a] Heavy.
[b] Slight.
[c] Hull Wet-Rub Tester.

The results in the above table show that glyoxal does not adversely affect wax pick. The reaction of a small amount of glyoxal with the high fluidity starch propionamide contributes a very marked increase in resistance to wet-rub. Thus, as the result of my invention it is now possible to improve the wet-rub resistance of paper coatings using a starch derivative and a polyaldehydic compound at a slightly alkaline pH to cross-link and render the starch coating resistance to removal by water.

I claim:
1. A process for preparing a starch composition of reduced water-solubility as compared to the parent starch derivative which comprises reacting a starch derivative selected from the group consisting of starch propionamide, the 2,4-diaminotriazine ether of starch and starch carbamate, with a polyaldehyde in aqueous medium, adjusting the pH to between about 4 to about 11 and drying.
2. The process of claim 1 wherein said starch derivative is starch propionamide.
3. The process of claim 1 wherein the polyaldehyde is dialdehyde starch.
4. The process of claim 1 wherein the polyaldehyde is selected from the group consisting of glutaraldehyde, α-hydroxyadipaldehyde and glyoxal.
5. A process for preparing a starch composition of reduced water-solubility as compared to the parent starch derivative which comprises gelatinizing a starch derivative selected from the group consisting of starch propionamide, the 2,4-diaminotriazine ether of starch and starch carbamate in aqueous solution in the presence of a polyaldehyde, adjusting the pH to between about 4 to about 11 and drying.
6. A process for preparing a starch composition of reduced water-solubility as compared to the parent starch derivative which comprises gelatinizing a starch derivative selected from the group consisting of starch propionamide, the 2,4-diaminotriazine ether of starch and starch carbamate in aqueous solution, adding a polyaldehyde, adjusting the pH to between about 4 to about 11 and drying.
7. A self-support film comprising the reaction product of a starch derivative selected from the group consisting of starch propionamide, the 2,4-diaminotriazine ether of starch and starch carbamate, and a polyaldehyde, said product having been dried at a pH of about 4 to about 11.

References Cited in the file of this patent
UNITED STATES PATENTS

| 2,853,484 | Lolkema et al. | Sept. 23, 1958 |
| 2,935,509 | Paschall | May 3, 1960 |
| 3,033,852 | Paschall | May 8, 1962 |
| 3,086,971 | Trimnell et al. | Apr. 23, 1963 |

FOREIGN PATENTS

| 770,089 | Great Britain | Mar. 13, 1957 |

UNITED STATES PATENT OFFICE
CERTIFICATE OF CORRECTION

Patent No. 3,127,393                      March 31, 1964

Frederick D. Thayer, Jr.

It is hereby certified that error appears in the above numbered patent requiring correction and that the said Letters Patent should read as corrected below.

Column 1, lines 21 and 22, strike out "triazine ether of starch prepared from starch and 2,4-diamino"; column 3, line 39, for "corse" read -- coarse --; line 48, for "effeffct" read -- effect --; line 55, for "insoluble" read -- insolubles --; line 59, for "The" read -- This --; column 4, line 9, for "set" read -- sets --; line 35, for "Films" read -- Film --; column 5, line 46, for "increases" read -- increased --; column 7, last table, first column, line 2 thereof, for "Satrch" read -- Starch --; column 10, line 2, for "resistance" read -- resistant --; line 34, for "self-support" read -- self-supporting --.

Signed and sealed this 15th day of September 1964.

(SEAL)
Attest:

ERNEST W. SWIDER                               EDWARD J. BRENNER
Attesting Officer                              Commissioner of Patents